United States Patent

Prachar

[15] 3,662,606
[45] May 16, 1972

[54] ACCELERATION SENSOR

[72] Inventor: Otakar P. Prachar, Santa Barbara, Calif.

[73] Assignee: General Motors Corporation, Detroit, Mich.

[22] Filed: Jan. 21, 1971

[21] Appl. No.: 108,455

[52] U.S. Cl. ................................................ 73/514
[51] Int. Cl. ............................................. G01p 15/02
[58] Field of Search ........................... 73/492, 514–517; 200/61.45 R, 61.53; 116/114 AH

[56] References Cited

UNITED STATES PATENTS 3,078,722  2/1963  Kongelbeck ..................... 73/515 X
3,117,196  1/1964  Vincent ........................... 200/61.45 R

*Primary Examiner*—James J. Gill
*Attorney*—W. E. Finken and Herbert Furman

[57] ABSTRACT

A sensor includes an operator mounted within a tubular guide for movement in one axial direction to an actuated position under a spring bias. The guide is mounted coaxially of a cylindrical support. A cylindrical seismic mass is slidable coaxially of the tube and support and is normally biased axially oppositely of the operator and against an end wall of the support by a coil compression spring seating against the other end wall of the support and a radial end wall of the mass. An annular retainer is slidable coaxially of the guide tube and includes an annular groove at one end thereof which includes a radial wall merging into an axial wall opening to a radial end wall of the retainer. A peripheral groove adjacent one end of the operator includes a conical wall located at a conical angle of approximately 60° to the axis of the operator. A plurality of balls are each freely received within a respective radial aperture of the guide tube and engage both the radial and axial walls of the retainer and the conical wall of the operator groove to detent the operator against movement. The retainer walls are spring biased into engagement with the balls by a coil compression spring seating on the other wall of the support and a radial flange at the one end of the retainer. The radial wall of the retainer is spaced a predetermined distance from the radial end wall of the mass. When an acceleration pulse of predetermined amplitude and time is applied coaxially of the mass, the movement of the mass engages the radial end wall of the mass with the radial wall of the retainer to move the retainer in the one axial direction and permit the balls to be forced outwardly of the retainer by the operator conical wall as the retainer axial wall moves axially and out of engagement therewith. This releases the operator. When the balls are released, they are received in an annular recess in the radial end wall of the mass.

6 Claims, 2 Drawing Figures

PATENTED MAY 16 1972

3,662,606

INVENTOR.
Otakar P. Prachar
BY
Herbert Furman
ATTORNEY

ACCELERATION SENSOR

This invention relates to sensors and more particularly to sensors of the type wherein an operator is releasably held in unactuated position by a plurality of detent balls releasable upon a seismic mass receiving an acceleration pulse of predetermined amplitude and time.

One of the features of the sensor of this invention is that the operator is mounted coaxially of a guide tube and biased in one axial direction, with the balls being held in detent engagement with a conical wall of the operator by an annular retainer mounted coaxially of the guide tube and resiliently biased in an opposite axial direction to retain axial and radial walls thereof in engagement with the balls and prevent movement of the balls out of engagement with the conical wall of the operator. Another feature of this invention is that the retainer is moved axially of the balls to release the operator by impact with an annular seismic mass movable coaxially of the guide tube when a pulse of predetermined amplitude and time is applied generally axially thereof. A further feature of this invention is that the conical wall of the operator engaged by the balls is located at a conical angle of approximately 60° to the axis of the operator to permit instantaneous movement of the balls out of engagement therewith when the balls are released by the retainer. Yet another feature of this invention is that the axial wall of the retainer terminates at a radial end wall of the retainer impacted by a radial end wall of the mass when the mass moves under the acceleration pulse of predetermined amplitude and time. Yet a further feature of this invention is that the radial end wall of the mass includes a recess which receives the balls when the balls are released by the retainer.

These and other features of the sensor of this invention will be readily apparent from the following specification and drawings wherein.

Figure 1:
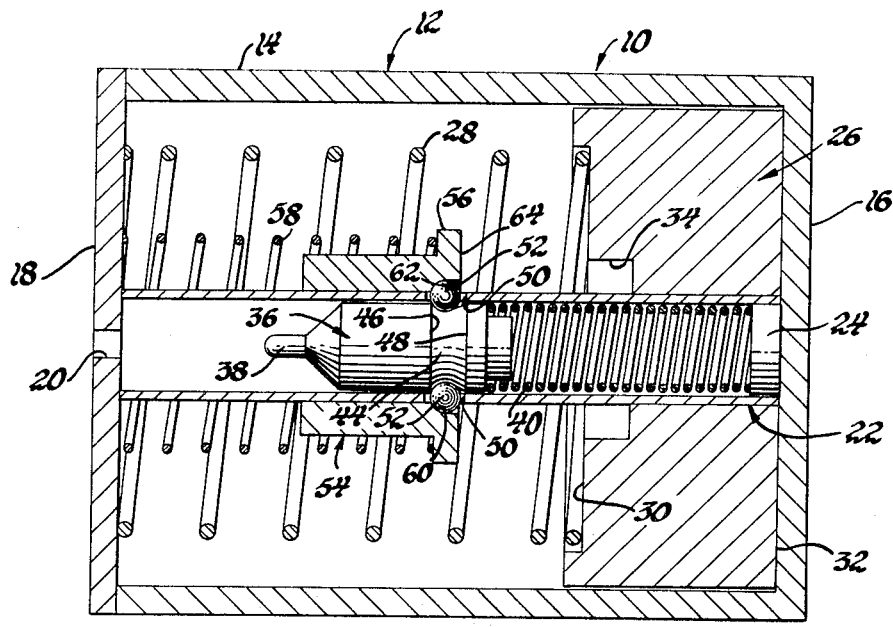
FIG. 1 is a view of the sensor in unactuated position.

Referring now particularly to FIG. 1 of the drawings, a sensor 10 according to this invention includes a support 12 comprised of a cylindrical housing 14 having a closed one end wall 16 and another end wall 18 centrally apertured at 20. A hollow cylindrical guide tube 22 extends between walls 16 and 18, with one end of the tube receiving a cylindrical embossment 24 of wall 16 and the other end of the tube being suitably secured to wall 18 and opening coaxially of the opening 20. A cylindrical seismic mass 26 of predetermined weight is slidably mounted on the guide tube 22 for movement coaxially thereof. The mass 26 is guided both by the guide tube and by the inner wall of housing 14. A coil compression spring 28 of predetermined strength surrounds the guide tube 22 and seats between the wall 18 of housing 14 and a recessed radial one end wall 30 of mass 26. Spring 28 holds an opposite end wall 32 of the mass 26 in engagement with wall 16 to locate the mass in a predetermined position axially of guide tube 22. The mass 26 further includes a cylindrical recess 34 which opens both axially of the wall 30 and radially of the guide tube 22.

Figure 2:
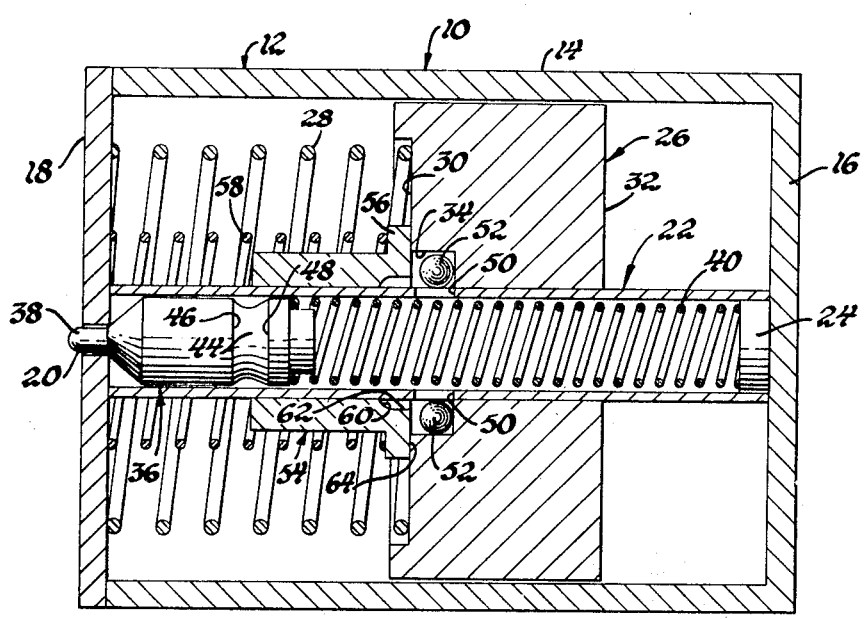
FIG. 2 is a view of the sensor in actuated position.

A cylindrical operator 36 is coaxially mounted within the guide tube 22 for movement between its unactuated position shown in FIG. 1 and its actuated position shown in FIG. 2 wherein a pointed end 38 of the operator projects through the opening 20 for engagement with a detonator, or a switch, or a diaphragm of a sealed pressure vessel for a purpose to be hereinafter explained. A coil compression spring 40 seats between the embossment 24 of wall 16 and the shouldered other end of the operator 36 to bias the operator to its actuated position. A peripheral groove 44 adjacent one end of the operator 36 includes an arcuate generally radially extending wall 46 which merges into a generally radial or conical wall 48 formed on a conical angle of preferably 60° to the axis of the operator. The guide tube 22 includes a plurality, preferably three or four, of radial apertures 50 each of which freely receives a ball 52. The radial wall 46 of the groove 44 conforms to the tangential periphery of the balls 52.

A cylindrical retainer 54 is slidable coaxially of the guide tube 22. A radial peripheral flange 56 at one end of the retainer seats one end of a coil compression spring 58, the other end of which seats on wall 18. Spring 58 is coaxial of springs 26 and 40 and of the guide tube 22 and is of less strength than spring 40. The one end of the retainer 54 includes a cylindrical recess comprised of a generally radially extending arcuate wall 60 which merges into a generally axially extending wall 62 of predetermined length terminating at the radial end wall 64 of the one end of the retainer. Wall 64 is spaced a predetermined axial distance from wall 30. As shown in FIG. 1, the tangential engagement of the balls 52 with the conical wall 48 of the operator and the radial and axial walls 60 and 62 of the retainer 54 under the opposing biases of the springs 40 and 58, normally detents the operator 36 in its unactuated position.

The spring 28 normally applies a force to the seismic mass 26 such that no movement of the mass can occur unless a load of approximately 2 to 3 Gs is applied thereto generally coaxial of the mass and of the guide tube 22. When a load exceeding this lower limit is received by the mass 26, the mass will, of course, move to the left as viewed in FIG. 1. When the load exceeds an upper limit, such as 8 Gs for a predetermined time in ms, the wall 30 of the mass 26 impacts the wall 64 of the retainer 54 and moves with the retainer to the left against the bias of spring 58 as shown in FIG. 2. When the its 54 moves to the left through what may be termed the integrating distance, that is, the axial extent of wall 62, the balls 52 will be released from the openings 50 and from axial wall 62 into the recess 34 of mass 26 to release the operator as shown in FIG. 2. The mass 26 will move with the balls 52 and the retainer 54 as a unit to the left as viewed in FIG. 2 until such time as the pulse has decayed to a lower limit whereupon the springs 58 and 28 return the mass 26 to its position shown in FIG. 1 and likewise hold the retainer 54 in engagement with the wall 30 of the mass to hold balls 52 in recess 34.

The balls 52 are forced out of the openings 50 and into the recess 34 by the action of the spring 40 and the camming action of wall 48 when the balls are released by retainer 54. The conical shape of wall 48 prevents any locking of the balls in the groove 44 when the balls are released by the retainer. It should also be noted that it is possible for the mass 26 to impact the retainer 54 and move the retainer through a distance less than the integrating distance if the impulse on the mass is applied for less than the predetermined time. The shape of wall 48 aids the retainer in returning to its position shown in FIG. 1.

If desired, the retainer 54 can be reversed end for end so that flange 56 is at the left-hand end of the retainer rather than the right-hand end as shown. The cylindrical recess of the retainer will then be located in the right-hand end of the retainer and recess 34 will be axially deepened so that wall 30 of the mass can engage flange 56 when the mass is subjected to an acceleration pulse of predetermined amplitude and time.

As previously mentioned, the pointed end 38 of the operator 36 may engage various members or mechanisms. The sensor of this invention is specifically intended for use with an inflatable cushion as part of a vehicle body occupant restraint system. Such a system includes an inflatable bag or cushion and a manifold connecting the cushion with a pressure vessel containing fluid under pressure, or such a pressure vessel containing both fluid and pyrotechnic material, or with a pyrotechnic gas generator. The detonator actuated by the operator may, for example, rupture the diaphragm of the sealed pressure vessel, or the operator may close the switch to initiate rupture of such diaphragm, or close a switch to initiate the pyrotechnic reaction.

Thus, this invention provides an improved sensor.

I claim:

1. A sensor comprising, in combination, a support, a generally tubular axial guide mounted on the support and including a plurality of radial apertures, an annular seismic mass mounted coaxially of the guide for movement relative thereto, means exerting a predetermined bias on the mass in one axial direction, means on the mass and support locating the mass in a predetermined axial position with respect to the guide, an operator mounted coaxially of the guide and including a generally annular radial wall, means exerting a bias on the operator in the opposite axial direction, an annular member mounted coaxially of the guide for movement relative thereto and including an annular radial wall merging into an annular axial wall of predetermined extent spaced radially of the guide, means exerting a bias on the annular member in the one axial direction, a plurality of balls, each freely received in a respective aperture of the guide and engaging the radial wall of the operator and the radial and axial walls of the annular member under the operator and annular member bias means to hold the operator against movement in the other axial direction, the application of a generally coaxial acceleration pulse of predetermined amplitude and time to the mass moving the mass in the other axial direction against the bias thereon to impact the annular member and move the annular member in the other axial direction, movement of the annular member moving the axial wall thereof out of engagement with the balls to release the balls from the annular member and from the operator to release the operator for movement under the bias thereon.

2. A sensor comprising, in combination, a support, a generally tubular axial guide mounted on the support and including a plurality of radial apertures, an annular seismic mass mounted coaxially of the guide for movement relative thereto and including a radial end wall having an annular recess opening axially therethrough, means exerting a predetermined bias on the mass in one axial direction, means on the mass and support locating the mass in a predetermined axial position with respect to the guide, an operator mounted coaxially of the guide and including a generally annular radial wall, means exerting a bias on the operator in the opposite axial direction, an annular member mounted coaxially of the guide for movement relative thereto and including an annular radial wall merging into an annular axial wall of predetermined extent spaced radially of the guide and terminating at one end of the annular member, means exerting a bias on the annular member in the one axial direction, a plurality of balls, each freely received in a respective aperture of the guide and engaging the radial wall of the operator and the radial and axial walls of the annular member under the operator and annular member bias means to hold the operator against movement in the other axial direction, the application of a generally coaxial acceleration pulse of predetermined amplitude and time to the mass moving the mass in the other axial direction against the bias thereon to impact the annular member and move the annular member in the other axial direction, movement of the annular member moving the axial wall thereof out of engagement with the balls to release the balls from the annular member and from the operator wall to release the operator for movement under the bias thereon, the mass recess opening to the one end of the annular member upon release of the balls for receipt thereof.

3. A sensor as recited in claim 2 wherein the one end of the annular member includes a generally radially extending flange impacted by the radial end wall of the mass to release the balls from the annular member.

4. A sensor as recited in claim 3 wherein the bias means for the annular member includes a compression spring seating on the support and the radial flange of the annular member.

5. A sensor as recited in claim 2 wherein the seismic mass and annular member move as a unit after impact, and the biasing means respective thereto move the unit in the one axial direction upon decay of the acceleration pulse below the predetermined amplitude and time.

6. A sensor comprising, in combination, a support, a generally tubular axial guide mounted on the support and including a plurality of radial apertures, an annular seismic mass mounted coaxially of the guide for movement relative thereto and including a radial end wall having an annular recess opening axially therethrough, means exerting a predetermined bias on the mass in one axial direction, means on the mass and support locating the mass in a predetermined axial position with respect to the guide, an operator mounted coaxially of the guide and including a generally radially opening peripheral groove having a conical wall generated about the axis thereof, means exerting a bias on the operator in the opposite axial direction, an annular member mounted coaxially of the guide for movement relative thereto and including an annular radial wall merging into an annular axial wall of predetermined extent spaced radially of the guide and defining therewith a recess opening to the seismic mass recess, means exerting a bias on the annular member in the one axial direction, a plurality of balls, each freely received in a respective aperture of the guide and engaging the conical wall of the operator and the radial and axial walls of the annular member to hold the operator against movement in the other axial direction, the application of an acceleration pulse of predetermined amplitude and time to the mass moving the mass in the other axial direction against the bias thereon to impact the annular member and move therewith in the other axial direction, movement of the annular member moving the axial wall thereof out of engagement with the balls to release the balls for movement into the recess in the radial wall of the mass.

* * * * *